Aug. 17, 1965     A. C. BALLAUER     3,200,887

HELICOPTER ROTOR SYSTEM HAVING ELASTOMERIC BEARINGS

Filed Aug. 9, 1963     4 Sheets-Sheet 1

SINUSOIDALLY-VARYING TORSION REACTIONS CYCLICALLY IMPOSED BY ELASTOMERIC BEARINGS.

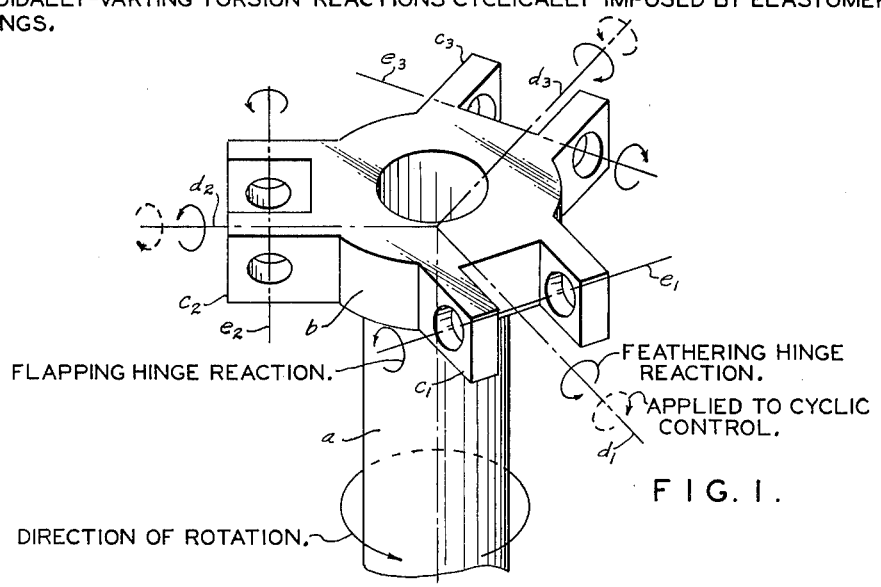

FLAPPING HINGE REACTION.

FEATHERING HINGE REACTION.
APPLIED TO CYCLIC CONTROL.

DIRECTION OF ROTATION.

FIG. 1.

TORQUE REACTIONS FROM CYCLIC BLADE MOVEMENTS IN HINGES.

USING CONVENTIONAL BEARINGS:

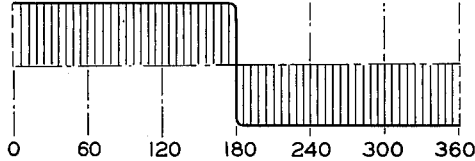

FIG. 9a.

USING PRESENT ELASTOMERIC BEARINGS:

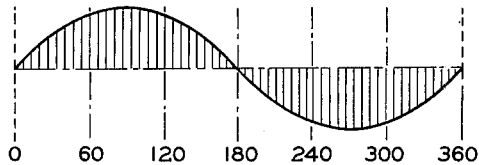

FIG. 10a.

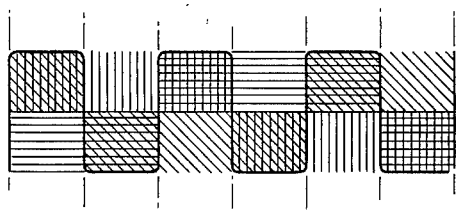

FIG. 9b.

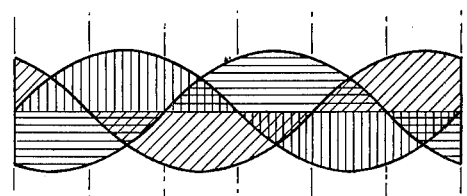

FIG. 10b.

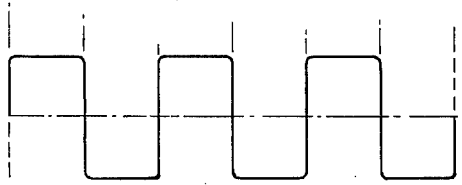

FIG. 9c.

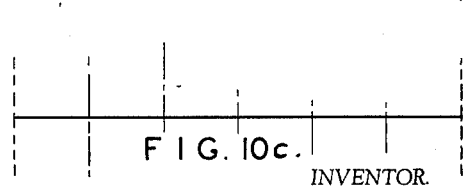

FIG. 10c.

INVENTOR.
ALB C. BALLAUER
BY
ATTORNEY

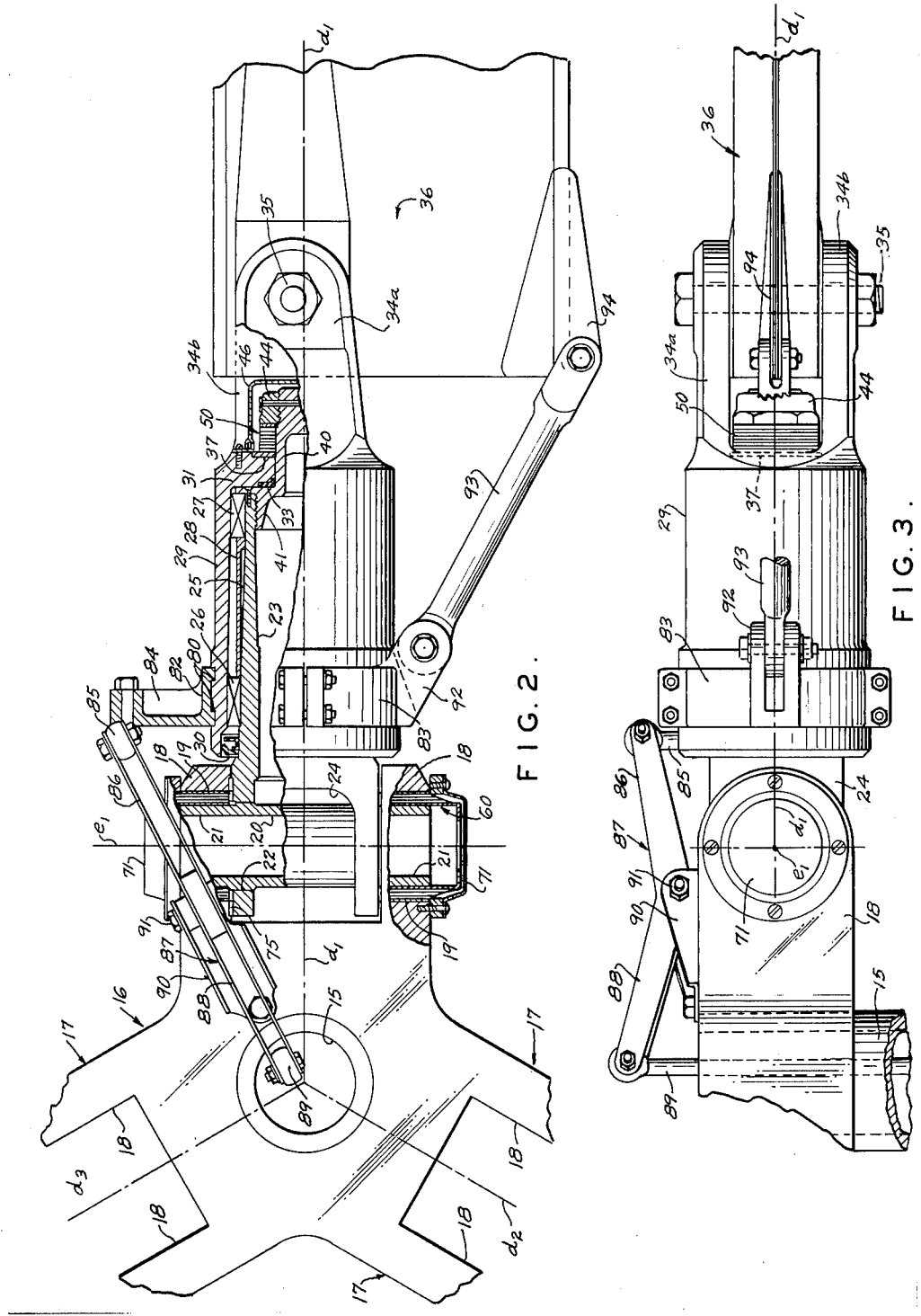

Aug. 17, 1965  A. C. BALLAUER  3,200,887
HELICOPTER ROTOR SYSTEM HAVING ELASTOMERIC BEARINGS
Filed Aug. 9, 1963  4 Sheets-Sheet 3
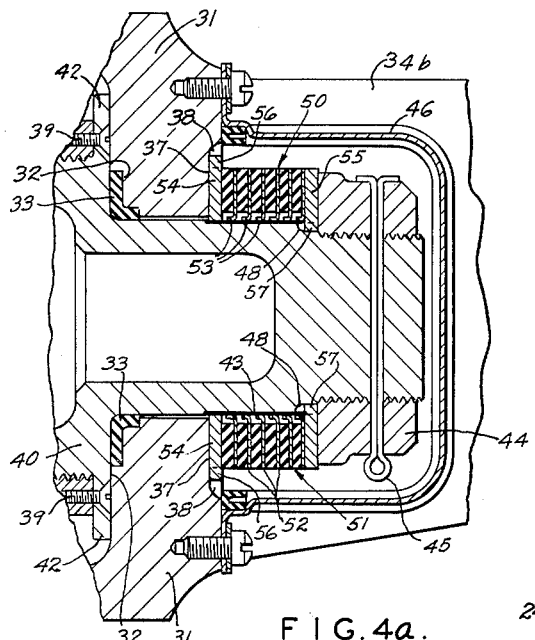
FIG. 4a.
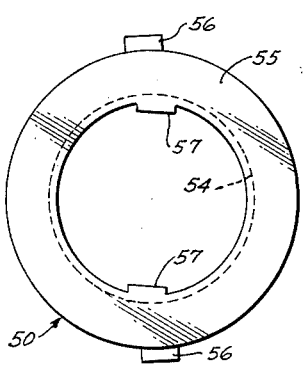
FIG. 4b.
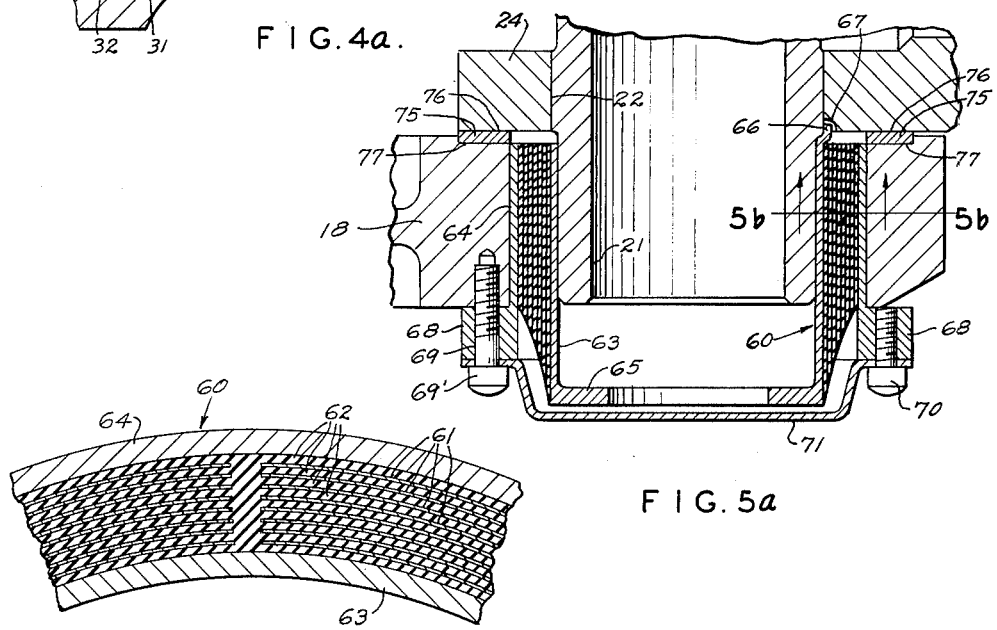
FIG. 5a
FIG. 5b.

Aug. 17, 1965  A. C. BALLAUER  3,200,887
HELICOPTER ROTOR SYSTEM HAVING ELASTOMERIC BEARINGS
Filed Aug. 9, 1963  4 Sheets-Sheet 4

ROTOR LAYOUT AT ZERO FLAPPING ANGLE.

ANGULAR MOVEMENTS ABOUT FLAPPING HINGES.

United States Patent Office 3,200,887
Patented Aug. 17, 1965

3,200,887
HELICOPTER ROTOR SYSTEM HAVING ELASTOMERIC BEARINGS
Alb C. Ballauer, Menominee, Mich., assignor to R. J. Enstrom Corporation, Menominee, Mich., a corporation of Michigan
Filed Aug. 9, 1963, Ser. No. 301,129
12 Claims. (Cl. 170—160.25)

This invention relates to helicopter rotor systems and particularly to provisions for bearings which withstand centrifugal loads.

The centrifugal forces attendant to rotations of the blade mass contribute important beneficial effects. As applied to rotors having flapping hinges, for example, the centrifugal forces limit the angle to which the rotor blades cone upward. As applied to the feathering hinges, the centrifugal forces of the blade masses forward and aft of the feathering axis provide a so-called "propeller moment," which tends to restore the blade to flat pitch. This propeller moment largely offsets the blade inertia to cyclic pitch change, thus easing the control forces.

Such beneficial effects of centrifugal force, while substantial, are seldom as great as would be useful. Also, they vary with radial distance, mass and the square of speed of rotation, factors which are disadvantageous under some conditions.

Apart from their variations, a principal disadvantage of the centrifugal forces lies in the frictional loads which they impose on the bearings affected. In designing helicopter rotor systems, it is a serious oversimplification to think of conventional bearings as being frictionless. When subjected to the centrifugal loads of the rotating blade masses, the friction is manifested in a bearing torque reaction, of nearly constant magnitude, which reverses itself each time the direction of movement within the bearing is reversed. Such reversals of bearing torque impose excitations upon the rotor hub and the control system.

A principal objective of the present invention is to provide increased beneficial effects analogous to those flowing from centrifugal forces, and yet eliminate completely the centrifugal force bearing friction effects. Further objects are to provide such beneficial effects in a manner which does not depend on rotational speed; and by means which may be readily tuned for maximum effectiveness at a particular chosen flight condition, for example, at cruising speeds. A still further purpose is to achieve such tuning correctively without changing the complex structural characteristics of rotor blades and control systems. Additional purposes will be brought out by the discussion which follows, and as the detailed mechanism and its operations are described.

I achieve these objects, in general, by using in the flapping and feathering hinges, laminated rubber and metal thrust-carrying elements (which may be referred to as elastomer bearings) which possess elastic restraint characteristics. I select these restraint characteristics to tune the particular system to those needs which might otherwise be supplied by additional centrifugal force effects, if such were available.

Increased thrust on such elastomeric bearings from centrifugal forces is not accompaned by increased bearing friction torque. The loads which their restraints impose, attendant to blade flapping and feathering movements, are sinusoidally varying loads. As will be shown, by eliminating the frictional characteristic, I eliminate the excitations attendant to reversals of the flapping and feathering movements.

In their effect on the helicopter mast, I have discovered that these substituted sinusoidally varying elastomeric constraint torques cancel each other, provided that the rotor utilizes three or more blades. In their effect on the control forces, the elastomeric restraints, in the feathering hinges of a rotor using three or more blades, result in a steady cyclic control force. By determining a correct elastomeric spring rate for these feathering hinge bearings, the cyclic control force may be reduced to a desired level at a chosen flight condition, for example, a zero control force at cruising rotor r.p.m.

With this explanation, still further purposes of this invention may be stated: to provide a rotor system utilizing three blades or more, of exceptional inherent smoothness; to construct feathering and flapping hinge assemblies of novel design using elastomeric bearings for centrifugal thrust while conventional bearings resist forward and aft thrust; to take positive advantage of the torsional spring rates of elastomeric bearings; to tune the cyclic control system by changing such spring rates; and to teach features of detail design of such bearings and their keyed fit in the flapping and feathering hinges, by which the exceptional results of the present invention are secured.

In the accompanying drawings:

FIGURE 1 is a sketch illustrating the torsion reactions which in the present invention are cyclically imposed by elastomeric constraint bearings within the feathering and flapping hinges of the rotor system.

FIGURE 2 is a plan view, partly cut away to show its interior construction of the hub, blade retention, articulation and control linkage for one blade of a three-bladed rotor.

FIGURE 3 is a side view, partly cut away, of the assembly shown in FIGURE 2, illustrated at zero flapping angle.

FIGURE 4a is an enlarged sectional view corresponding to FIGURE 2 of the elastomeric feathering hinge bearing in its immediate environment. FIGURE 4b is an end view of said bearing.

FIGURE 5a is an enlarged sectional view corresponding to a fragment of FIGURE 2, showing one of the flapping hinge bearings. FIGURE 5b is a further enlarged sectional fragment, somewhat simplified, taken along line 5b—5b of FIGURE 5a.

Figure 6:
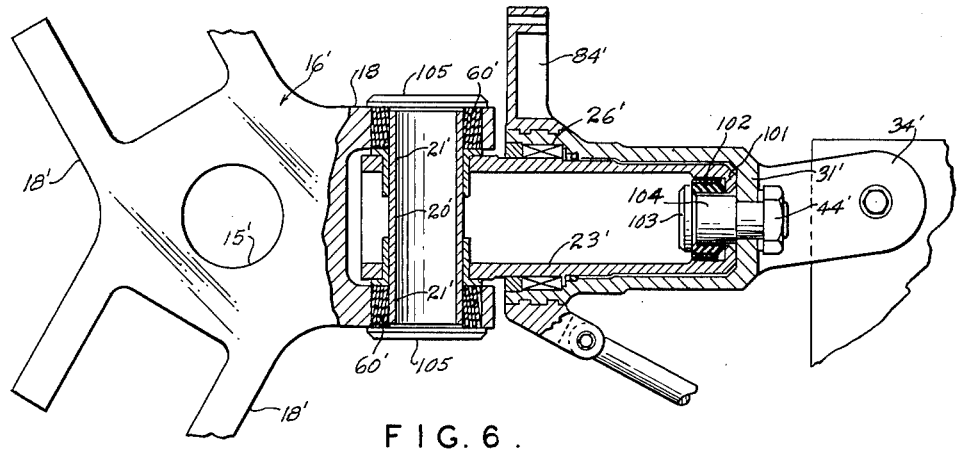
FIGURE 6 is a plan view corresponding to FIGURE 2 but somewhat simplified, of an alternate embodiment of the invention.

FIGURES 9a, b, and c are graphs illustrating how, in a three-bladed rotor system, three-per-rev excitations are caused by bearing friction and occur on reversals of blade flapping and feathering movements.

FIGURES 10a, b, and c are graphs similar to FIGURES 9a, b, and c contrasting the sinusoidally-varying reactions of elastomeric bearing constraints and showing how they offset each other in the three-bladed system.

The underlying concept of the invention is sketched in FIGURE 1, and will now be described. A conventional powered rotor mast $a$ has its hub $b$ rigidly affixed, with pairs of parallel clevis fittings $c_1$, $c_2$, $c_3$ projecting radially to establish blade feathering axes $d_1$, $d_2$, $d_3$. Bores through the clevis members establish substantially horizontal flapping axes $e_1$, $e_2$, $e_3$ offset from the axis of the mast $a$ and in the embodiment shown, perpendicular to the flapping axes $e_1$, $e_2$, $e_3$. This is familiar structure; in some applications, such perpendicularity may be departed from, for purposes known in the art.

The clevis fittings $c_1$, $c_2$, $c_3$ represent the inboard portions of the preferred blade articulation system, hereinafter referred to as a rigid in-plane rotor system, which incorporates flapping and feathering hinges but no drag hinges. Within the clevis fittings $c_1$, $c_2$, $c_3$ the inboard ends of spindles, hereinafter described, are to be secured on flapping hinge pins, for flapping movement about the flapping axes $e_1$, $e_2$, $e_3$; on such spindles are mounted bearings holding outer sleeves which comprise the inboard ends of blade grip members. Such spindle-bearing-sleeve assemblies permit angular pitch change of the blades about their feathering axes $d_1$, $d_2$, $d_3$.

In the generalized system so described, I insert elastomeric constraint bearings, hereafter more fully described, to withstand all centrifugal force loads. The rate of flapping and feathering angular movements of the blades about these axes will vary sinusoidally. By using elastomeric constraints and avoiding the torques of blade friction, I attain sinusoidally varying torsion reactions, both on the mast and on the control system. The usefulness of these reactions will be explained later herein.

FIGURE 1 illustrates these reactions by curved arrows as follows: the mast reactions of the flap hinge elastomeric constraints, accompanying movements about the flapping axes $e_1$, $e_2$, $e_3$, by the arrows about said axis, identified as "Flapping Hinge Reactions"; and the equal but opposite mast and the control system reactions from both ends of the feathering hinge constraints, respectively identified as "Feathering Hinge Reactions" and "Applied to Cyclic Control." The feathering hinge constraints act in a sense to reduce blade pitch.

This being the basic structural and mechanical concept of the present invention, the preferred embodiment of structure and mechanism illustrated will be described, and its novel operations explained. As shown in the plan view, FIGURE 2, a hollow tubular rotor mast 15 has rigidly mounted on its top end a hub generally designated 16 including three pairs of clevis fittings generally designated 17. Each of the clevis fittings 17 includes a yoke-like pair of clevis members 18 extending parallel to each other forward and aft of the radial feathering hinge axes $d_1$, $d_2$, $d_3$, heretofore described. Relatively large aligned bores 19 in the clevis members 18 establish the flapping axes $e_1$, $e_2$, $e_3$, referred to in connection with FIGURE 1, offset from the axis of the mast 15 and perpendicular to it as well as to the respective feathering axes $d_1$, $d_2$, $d_3$. Details are shown for only one of the three portions of the hub, retention, articulation and controls, it being understood that the others are identical.

Fitted on the axis $e_1$ within the bores 19, by the elastomeric flapping bearing hereinafter to be described, is a hollow rugged flapping hing pin 20 whose end portions 21 extend through the clevis bores 19 and whose axial length is equal to the spacing of the outermost faces of the clevis members 18. The outer diameter of the flapping hinge pin 20 is substantially less than that of the bores 19.

Between the clevis members 18 and tightly press-fitted on the outer wall of the tubular flapping hinge pin 20 are the bores 22 of the inboard yoke-like end of the flapping connector means, hereinafter described, by which a rotor blade 36 is affixed to its pin 20 for fixed flapping movement. Such connector means may be referred to as a spindle, generally designated 23, extending radially outward from an inboard end yoke portion 24 beyond which the spindle 23 is of hollow circular cross-section, as shown. The spindle 23 includes a gradually tapered radially outer surface 25; on this surface is mounted an inboard radial thrust bearing 26, such as the needle bearing shown, and an outboard needle bearing 27, the two being spaced apart by a flanged cylindrical bearing spacer 28. The bearings 26, 27 carry no centrifugal thrust loads. Apart from carrying forward-and-aft loads, their function is to align the blade retention means, hereafter described, upon the feathering axes $d_1$, $d_2$, $d_3$ for relative angular movement about the spindle 23. Such retention means includes a heavy, substantially cylindrical or cup-like sleeve member or portion 29, fitted securely onto the bearings 26, 27. An inboard end circular seal 30 between the spindle 23 and the sleeve 29 is provided as shown.

The sleeve member 29 has, radially outward of the outboard needle bearing 27, a radially-inward flange 31, extending about half-way inward toward the feathering axis $d_1$. On its surface facing toward the mast 15 it presents an inward annular shoulder 32 notched to accommodate a circular grease seal 33.

Spanwise outboard from the flange 31, the sleeve member 29 is extended, above and below, to provide blade retention means. These means may consist of a yoke-like pair of flattened upper and lower blade grip members 34a, 34b bored vertically in alignment near their outboard ends to receive a principal blade retention bolt 35 by which is retained the inboard end of the spar portion of a rotor blade generally designated 36. Between the upper and lower blade grip members 34a, 34b, at the outer side of the flange 31, is provided a recessed annular load-applying face 37, interrupted along its outer edge by two opposite forward-and-aft notches 38, which key angularly the inboard end of the elastomeric feathering bearing hereinafter described.

Threaded within the outer end of the spindle 23 and extending outboard therefrom along the axis $d_1$ is a pin member generally designated 40, on which such elastomeric bearing is mounted. The inboard end of the pin member 40 is radially enlarged and includes an axially inward flange 41 threaded on its outer side to engage threads on the inner surface of the hollow spindle member 23. A slender, radially outward flange extension 42 abuts against the outboard end of the spindle member 23, is keyed angularly by screws 39 and extends radially beyond the outer spindle surface 25 sufficiently to act as a keeper for the outboard needle bearing 27. Such flange extension 42 fits between the outboard end of the spindle and the shoulder 32 of the flange 31. The juncture of the flange extension 42 with the portion of the pin member 40 immediately outboard of it is seated against the grease seal 33 to prevent the escape of lubricant from the needle bearings 26, 27.

A portion of the radially-outer surface of the pin member 40, outboard of the sleeve flange 31, is slightly recessed and fitted with a slick abrasion resistant surfacing material such as the Teflon plastic strip 43. Outboard of the strip 43, the end of the pin member 40 is threaded to receive a centrifugal load-resisting nut 44, safetied by a cotter pin 45. The nut 44 serves as centrifugal load-resisting means, opposed to the load-applying face 37 of the radially inward flange 31 of the sleeve member 29. Immediately inboard of the threads on its end, the pin member 40 has a pair of opposite, longitudinal keyways 48 which serve to key angularly the outer end plate of the elastomeric feathering bearing hereinafter described.

The torsional constraints indicated in FIGURE 1 by the opposed pairs of curved arrows about the feathering axes $d_1$, $d_2$, $d_3$, marked "Feathering Hinge Reactions to Cyclic Control," are furnished by feathering hinge elastomeric constraint bearings, as generally dessignated 50. In FIGURE 3 the cap 46 is omitted to show a side view of the bearing 50; its section and elevation views are FIGURES 4a and 4b. The bearing 50 consists of a stack of extremely thin metal laminates of flat washer-like form, as of brass or steel approximately .001" thick, adhered together by alternating layers of elastic rubber or rubber-like material which may be slightly thinner, say .0075". Because of their extreme thinness, the metal and rubber laminates are not separately illustrated. It is known that thin layers of rubber, adhered between metal laminae, will withstand high loads in "bearing" using this term in the structural sense; that is, the rubber withstands compressively the forces applied by the metal layers, it being so thin as to be restrained from flowing sidewise by its adhesion to the metal. The elastomeric constraint bearings are not "bearings" in the usual mechanical sense of allowing unlimited angular rotation. To the contrary, each thin laminate is capable of very limited angular twist, accompanied by torsional shear stress proportionate to the angular deflection. This explains why the term "torsional constraint bearing" is used in this specification.

For stability under compressive loads, the large number of alternate laminates of rubber and metal, sufficient in number to permit a chosen amount of angular rotation at a selected spring rate (the rate at which torque moment increases with angle of twist), are assembled in several washer-like stacks 51, each approximately .1" high. These are bonded together, separated by internally flanged washer-like rings 52 of heavier metal, called "slipper rings." The flanges 53 of the rings 52 are spaced slightly inward from the innermost edges of the rubber and metal layers which make up the stacks 51. When the elastomeric bearing 50 as a whole is distorted torsionally, end to end, any tendency toward sideward instability will not interfere seriously with its functioning; instead the slipper ring flanges 53 may rub harmlessly against the Teflon strip 43 mounted on the pin-like member 40.

The elastomeric bearing 50 is completed by bonding to its inboard and outboard ends an inboard end plate 54 and outboard end plate 55. The plates 54, 55 are flat and washer-like; their radial extent corresponds generally with the slipper rings 52. The inner and outer peripheral edges of the plates 54, 55 are circular except for their respective keying provisions 56, 57. The inboard end plate 54 fits bearingly against the recessed load-applying face 37 of the sleeve member flange 31, with its keying provisions 56 extending diametrically opposite each other and outward, to engage keyingly wtih the notches 38. The nut 44 is turned to bear against the outer side of the end plate 55, whose keying provisions 57 extend radially inward, engaging within the keyways 48 of the pin member 40.

The relative angularity of the keying provisions or tabs 56, 57, shown in FIGURE 4b, suggests how the end plates 54, 55 may be mounted to achieve desired variations in the blade pitch angle at which the bearing 50 exerts no torsional constraint. It will be apparent, however, that this depends in actuality upon the relative angular alignment about the axis $d_1$ of all the parts which are so assembled, including: the angle at which the blade grip members 34a, 34b are machined to hold the blade 36, that at which the forward and aft notches 38 project from the recessed load-applying face 37, that at which the keyways 48 are cut in the pin member 40, and that at which the screws 39 secure the pin member 40 in its threaded engagement with the spindle 23.

Figure 7:
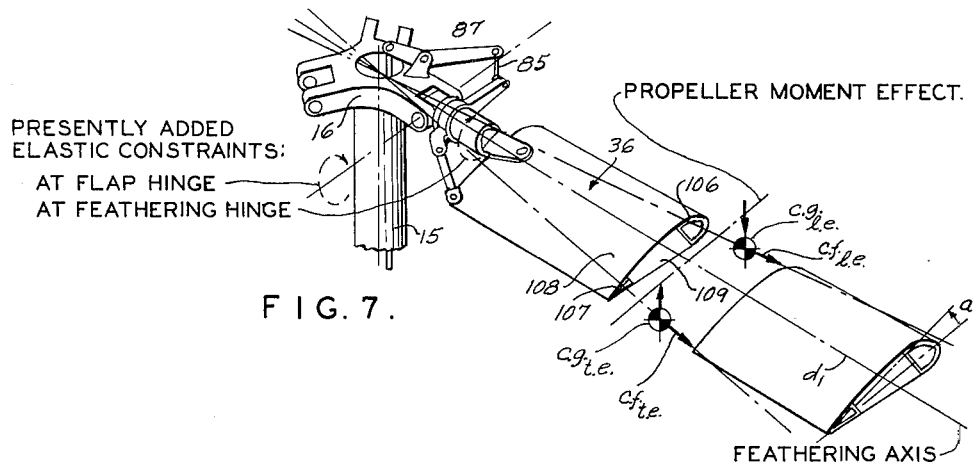
FIGURE 7 is a perspective sketch of the rotor layout at zero flapping angle, schematically illustrating the "propeller moment" tendency accompanying centrifugal force to restore a blade to flat pitch; also showing the presently added elastic constraints which add to beneficial centrifugal force effects.

Mounted as shown in FIGURE 2, these keying and alignment provisions serve as means to impart the torsional constraint of the feathering hinge elastomeric bearing 50 as shown in FIGURE 7, in the same sense as an increase in blade pitch-reducing "propeller moment," such as accompanies centrifugal force. This phenomenon is discussed later.

It is not always necessary to design the bearing 50 to have a torsional constraint which will precisely "tune" the blade-feathering control system, as hereafter described. The bearing 50 will, nevertheless, react the entire blade centrifugal force load. It receives the thrust of this load from the face 27 of the sleeve flange 31, and reacts the thrust at the nut 44 which transmits it to the pin member 40 and thus to the spindle 23. The radial thrust bearings 26, 27 are not subjected to the centrifugal thrust load, and will therefore turn freely.

On the flapping hinge axis $e_1$, flapping hinge bearings generally designated 60 are inserted axially around both ends 21 of the hinge pin 20, supporting its ends within the bores 19. A bearing 60 is shown in its environment in FIGURE 5a and in greatly enlarged fragmentary section in FIGURE 5b. It is made up of alternating split cylindrical metal laminates 61 and continuously rubber laminates 62 in which the rubber merges into and fills the small gaps in the split metal laminates 61. The laminate thickness coincides generally to the laminates of the feathering bearing 50, but on bonding the bearing 50, it is completed by a radially inner, continuous metal inner cylinder 63 adherently secured, which forms its inner bearing wall, and the radially outer metal cylindrical wall 64.

At its axially outer end, the radially inner cylindrical wall 63 has a strengthening flange 65, turned radially inward. The inner wall 63 is of greater axial length than the outer wall 64; the laminates therebetween taper to a lesser axial extent outboard, which at its minimum is substantially equal to the thickness of a clevis member 18. Over this axial extent, the entire centrifugal load arising from rotation of the blade is transferred between the pin portions 21 and the clevis members 18. However, for torsional restraint against flapping movements, the entire extent of the tapering cylinder of rubber laminates 62 is operative.

As with the feathering bearings 50, keying means are used to determine an angle at which the flapping bearings 60 will exert no torsion. Such keying is effected at the radially inner metal cylindrical wall 63 by an inner end projection 66 which projects axially inward of the clevis member 18 to engage a keying notch 67 cut into inboard end yoke portion 24 of the spindle 23. At the radially outer cylindrical wall 64, keying is accomplished by setting one of several bores 69 through radially outer flange 68 at a pre-determined angular position with reference to the clevis member 18, holding this position by a keying screw 69'. Other screws 70, somewhat shorter, hold the dust caps 71 which cover the axially outer end of the bearings 60.

The keying means so described imposes the torsional constraint of the bearing 60 whenever flapping movements occur between the blade and the hub. The keying angle is determined so that torsional constraint of the bearing 60 will be zero at the mid-point of the range of flapping angles at cruising speed. The torsional spring rate of the bearing 60 then has much the same beneficial effects as would an increase in centrifugal force.

The chordwise fore-an-aft loads on the spindle 23 are preferably reacted through more conventional, non-elastic bearing means. Washer-like sintered bearings 75, which may be made of sintered bronze impregnated with a slick friction-resisting material such as the plastic known by the name "Teflon" serve as annular bearing means. The annular bearings 75 are interposed between bearing faces, as follows: annular forward-and-aft load-applying faces 76 on the forward and aft sides of the inboard end yoke portion 24 of the spindle 23; and registering annular forward-and-aft load-resisting faces 77 on the inner surfaces of the clevis members 18. These transfer forward-and-aft forces to the hub, relieving the elastomeric bearing 60 of any loads other than the compressive bearing loads attendant to centrifugal thrust and the torsional reaction to flapping movements.

Mounted in annular grooves 80 adjacent to the inboard end of the outer surface of the sleeve member 29 is a bolted-together split collar including a forward collar half 82 and a rearward collar half 83. The forward collar half 82 includes an integral forward-extending control arm portion 84 connected at its forward end to a nearly vertically-extending pitch link 85, which is pivotally secured at its upper end to the outward-extending arm 86 of a control bell crank generally designated 87. The bell crank 87 has an inward-extending arm 88 which projects over the hollow central portion of the mast 15, where it is pivotally connected to a vertical push-pull control rod 89 operated from the lower end of the mast 15 by a swash plate or equivalent mechanism, not shown. A control bracket 90 bolted to the upper surface of the hub 16 mounts the bell crank 87 on a horizontal fulcrum pin 91 for rocking angularly. The rearward collar half 83 includes an aft-extending horizontal lug 92 to which is secured the inboard end of an outward-and-aft extending trailing edge drag link connector rod 93. Its outboard end is securely bolted to the root end trailing edge fitting 94 of the rotor blade generally designated 36.

Chordwise loads on the rotor blade will be resisted as between the blade grip members 34 and the trailing edge connector rod 93. Inasmuch as the center of gravity of the blade 36 will have a chordwise position nearly radially aligned with the principal blade retention bolt 35, the centrifugal load imposed by the blade will be carried principally through the blade grip member 34a, 34b and directly imposed by a flange 31 in compression onto the feathering hinge bearing 50. Any portion of the centrifugal load carried by the trailing edge connector rod 93 is transmitted through the sleeve 29 to the flange 31. The forward-and-aft thrust loads, whether imposed by the grip members 34a, 34b or the trailing edge connector 93, are transmitted through the sleeve 29, needle bearings 26, 27 and spindle 23 to its inboard end yoke portion 24 and thus to the sintered bearings 75.

The alternate embodiment sketched in FIGURE 6 is generally similar except in respects illustrated. On a powered mast 15' is affixed a rotor hub generally designated 16', having three pairs of clevis members 18' in which tubular flapping hinge pins 20' are mounted on offset hinge axes, similar to the axes of the principal embodiment. A spindle 23' is mounted on the pin 20' for movement about its offset flapping axis, and is fitted with a needle bearing 26' at its inboard end only. The spanwise outboard end of the spindle 23' has a radially-inward flange 101 immediately inboard of a radially-inward flange 31' of the sleeve member. The spindle inboard end flange 101 abuts against and is angularly keyed to the outboard end of a laminated elastomeric bearing generally designated 102, generally similar to the elastomeric bearing 50 save that all its laminates are frusto-conical. The bearing 102 is illustrated so that these laminates slope spanwise outboard and radially inward toward the feathering axis. By their slope they provide a centering action which resists forward-and-aft thrust loads. Against the inboard end of the bearing 102 seats the centrifugal thrust resisting head 103 of a pin member 104 about which the bearing 102 is mounted. The pin member 104 is secured at its outboard end of the sleeve's radially inward flange 31' by a nut 44' located spacedly between the upper and lower blade grip members 34'.

About the forward and aft ends 21' of the pin 20' are inserted frusto-conical laminated elastomeric flapping hinge bearing generally designated 60', similar to the bearings 60 except for their frusto-conical shape. The radially inner walls of the bearing 60' are keyed to the pin end 21'; their radially outer walls are keyed by forward and aft end plates 105 to the clevis members 18'. The frusto-conical laminations of the bearing 60' are slanted radially inward toward each other along the flapping axis; hence, in addition to carrying the centrifugal load, the bearings 60' resist forward-and-aft loads partly in compression. As contrasted with the first-described embodiment, this eliminates using sintered bearings 75 and the bearings faces which they engage. However, the first-described embodiment is considered generally preferable, as it includes separate bearings provisions for the fore and aft loads, both as applied to the feathering hinge and to the flapping hinge.

As to both of the embodiments described, the rotor articulation layout, shown at zero flapping angle, is sketched in FIGURE 7. The phenomenon known as "propeller moment" arises for rotation, accompanying centrifugal forces on the masses which make up a rotor blade such as the blade 36. For a simple blade structure, consisting principally of an extruded spar 106, a trailing edge extrusion 107, an upper skin 108 and a lower skin 109, the masses of the blade are quite concentrated. For a simplified review, masses forward of the feathering axis $d_1$ may be considered as concentrated at a forward, or leading edge, center of gravity, $cg_{le}$; whereas the masses aft of the feathering axis $d_1$ may be considered as concentrated at a trailing edge center of gravity, $cg_{te}$. If the blade is of substantially constant chord for its entire spanwise extent, and the structure is nearly uniform, these centers of gravity will be approximately at mid-span.

If the featuring angle of the blade is changed, the centrifugal force acting on each element of blade mass tends to keep it removed the maximum possible distance from the mast 15 about which it is rotating. Any change in blade pitch angle away from flat pitch tends to lessen the radial distance to the centers of gravity $cg_{le}$ and $cg_{te}$ which do not lie on the feathering axis $d_1$. Therefore a component of the centrifugal force acting on each will tend to turn it about the axis $d_1$, back to flattened pitch position. These components, shown in FIGURE 7, make up a couple of turning forces, called "propeller moment" which resists angular pitch change increases. Such "propeller moment" will not, in practical cases, be sufficient to overcome the inertia of the blade masses in their resistance to oscillating pitch change movements.

Since the angle blade pitch is to be varied sinusoidally by the control system during each cycle of rotation, the inertia torque of the blade and control system elements which resist such change may be considered as equivalent in their effect to a spring having an ascertainable rate, here designated "equivalent inertia torque spring rate." At a chosen rate of rotation, the offsetting effect of the "propeller moment" may also be treated as equivalent to a spring rate; it is so designated here as a "propeller moment spring rate."

In the present invention, the spring rate of the elastomeric feathering hinge bearing 50 is interposed (as shown in FIGURE 7) so as to add to the equivalent propeller moment spring rate. The elastomeric bearing spring rate materially relieves the deficiency between the "propeller moment spring rate" and the "equivalent inertia torque spring rate." Hence the bearing 50 serves as means for tuning the articulation system. Such tuning is effected solely by changing the torsional spring rate of the elastomeric feathering hinge bearing 50 (for example, doubling the height of the laminate stack will cut in half the torque moment per degree of deflection). The mass of the bearing 50 is so small in relation to the total of rotating masses that doubling it would not substantially change the centrifugal force or inertia to upset the tuning process. Further, the torsional spring rate of bearing 50 is independent of rotational speed. This simplifies the problem of achieving optimum tuning at any chosen condition of flight.

In the flapping hinges, the elastromeric bearings 60 add their torsional restraint in the sense as tends to "stiffen" the hinges similarly to an increase in centrifugal forces. As in the feathering hinge system, the elastomeric bearings 60 do not add to the masses of the system which would change the centrifugal loading, nor does their elastromeric constraint depend on rotational speed. Hence they are well suited to "tune" a rotor system without requiring structural redesign.

Figure 8:
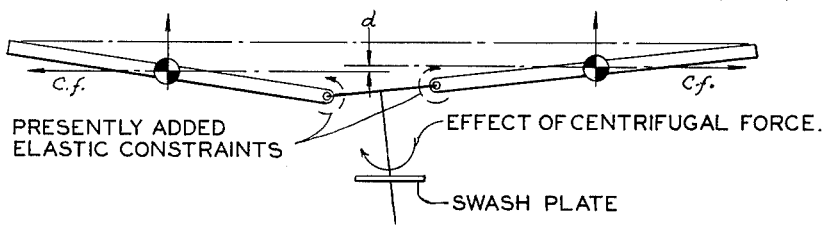
FIGURE 8 is a perspective sketch (simplified by showing two opposite blades) illustrating how centrifugal forces function in an offset flap hinged rotor, and how the spring restraint of flap hinge elastomeric bearings adds to the beneficial aspects of centrifugal force.

The most obvious beneficial effect of centrifugal forces on a flap-hinged rotor is a permit flapping hinges to be employed; the centrifugal force holds the blades outward, resisting the tendency of the lift forces to cone the blades upward. The elastomeric bearings 60 aid in its effect, as illustrated in FIGURE 8. If, as in the present embodiments, the flapping axes $e_1$, $e_2$, $e_3$ are offset from the mast axis, the further tendency of centrifugal forces is to add a "righting moment" when the hub is tilted with reference to the tip path plane. This "righting moment," illustrated in FIGURE 8, is a function of the moment arm $d$ between the higher side level and lower side level at which the centrifugal force vectors act. The elastomeric bearings 60 impose their spring constraints proportionate to coning angular deflection, much in the same manner as if more centrifugal force was present (though without dependence on rotor speed), and hence permit a greater displacement of the helicopter center of gravity from the motor mast.

Both the feathering and the flapping hinges are provided, in large measure, for the same purpose, namely, cyclic control of the blade lift coefficient. As stated in Shapiro, "Principles of Helicopter Engineering," McGraw Hill, page 173, ". . . an amount of cycle feathering replaces an equal amount of cyclic flapping." The functioning of the two hinges may also be interrelated mechanically by the projection of the bell crank 87 across the flapping axis $e_1$, resulting in "delta 3 coupling," in which any disturbance of smooth movement about either hinge will tend to disturb the other.

Tuning of the feathering hinge bearing 50 to the characteristics of a blade and its controls may proceed to the point of theoretically perfect balancing out of dynamic forces. The example given involves a light-weight three place helicopter, of otherwise conventional design.

The "equivalent inertia torque spring rate" Q is found as follows:

Total mass polar moment of inertia $$I_{p\ total} = I_p \text{ of blade} + I_p \text{ of cyclic controls}$$

$$I_p \text{ of blade} = (I_{xx} + I_{yy})\frac{\delta R}{g}$$

where $I_{xx}$=moment of inertia of blade about its minor axis (here .359)
$I_{yy}$=moment of inertia of blade about its major axis (here 12.91)
$\delta$=density of blade (here .1#/cu. in.)
$g$=acceleration of gravity (386.4 in./sec.$^2$)
$R$=rotor blade length (here 174")

$I_p$ of controls is here calculated at .312

$\omega$=rotor rate of rotation=36.63 radians/sec. (that is, 350 r.p.m.)

Then:

$$Q = -\omega^2 \times I_{p\ total} = -\omega^2[I_{p\ blade} + I_{p\ controls}]$$

$$= -36.63^2 \times \left[(.359 + 12.91) \times \frac{.1 \times 174}{386.4} \times I_{p\ controls}\right]$$

$$= 1343 \times [.597 + .312]$$

$$= 1120.8''\#/\text{rad. (or, dividing by 57.3)}$$

$$= 21.30''\#/\text{degree}$$

The "equivalent propeller moment spring rate" accompanying centrifugal force, $M_{cf}$ is found as follows: taking the total angle $\theta$ through which the blade moves in pitch change as equal to 10°, $$M_{cf} = 1/2\omega^2(I_{yy} - I_{xx}) \times \delta/g \times R \times \sin 2\theta$$

$$= \frac{36.63^2}{2}(12.91 - .359)\frac{.1}{386.4} \times 174 \times .342$$

$$= 129.8''\# \text{ for 10 degrees}$$

or 12.98"#/1 degree

Then, for perfect dynamic tuning, the spring rate $C_b$ for the feathering bearing 50 is designed at the difference between these "equivalent spring rates."

$$C_b = Q - M_{cf}$$

$$= 21.30 - 12.98$$

$$= 8.32''\#/\text{degree}$$

Of equal significance with the new positive features of structure, control and tuning, is the new avoidance of excitations to the mast and control system. It will now be shown that such excitations were inherently present in prior articulation systems, and how the present invention avoids them.

It is erroneous to think of conventional bearings as permitting unrestrained rotative movements.

When the centrifugal load imposed by a rotating rotor blade is applied, for example, to the pitch change bearing, the resulting bearing friction is too great to be overlooked. It amounts to a frictional torque which resists angular rotation. The sense in which the frictional torque is exerted reverses with each reversal of direction of angular movement.

FIGURE 9a is a graph showing somewhat schematically these reversing frictional torques in any bearing (for example, a feathering hinge bearing) whose angular movement is inhibited by high centrifugal forces. Although the control system requires the change of blade pitch angle to occure sinusoidally in the cycle of rotation, the bearing frictional torque reaction manifests itself as nearly a square wave, reversing at each 180° of the cycle. This bearing friction torque, in the case of a feathering hinge bearing, is exerted both on the control system and on the mast.

In a rotor system having three blades, these reversing frictional torque reactions will be felt at 120° intervals. FIGURE 9b repeats the graph of FIGURE 9a, in which the reaction is shown by vertical lines, and superimposes at 120° intervals the reactions from the other two rotor blades, shown by horizontal lines and diagonal lines respectively. Those portions of FIGURE 9b wherein two sets of such lines overlay each other indicate the torque reactions from two blades, which reactions are directed in the same sense.

FIGURE 2c shows the algebraic sum of the superposition of these reactions. At 60° intervals, there is a net reversal of frictional reaction, yielding a three-per-rev exciting force. The feathering hinge bearings in conventional systems necessarily impose this excitation on the mast. The pilot control (swash plate or equivalent) will receive similar impulses.

In the present invention, I do not try to minimize bearing friction; instead I substitute for friction a known torsional constraint selected as above calculated. This substitution eliminates such three-per-rev excitations, provided a rotor system having three blades or more is used. This is demonstrated by the graphs of FIGURES 10a, b, c.

Regardless how great may be the torsional constraint of an elastomeric bearing, where the angular movement within it varies sinusoidally (typical of pitch change movements and blade flapping movements) the magnitude of its torque reaction will also vary sinusoidally, as in FIGURE 10a. If three such sinusoidal waves are manifested at 120° intervals, as shown in FIGURE 10b, and added algebraically, the result, shown in FIGURE 10c, will be zero throughout the entire cycle of rotation.

Referring to FIGURE 10b, at each point one of the curves passes through zero, the other two are equal and opposite. At each point that any curve equals its maximum or minimum, the others are opposite to it and each is of half its magnitude. It can be shown that this cancelling quality exists at all angles. Also, it applies to numbers of blades greater than three. This contrasts with the inherent effect of friction on conventional bearings; regardless how small such friction may be, the reactions of its inherently cannot cancel out.

As applied to the blade feathering hinge of a rotor having three blades or more, this cancelling effect eliminates the excitations regardless what spring rate $C_b$ is chosen. For example, if it be chosen at a value not sufficient to overcome completely the deficiency of the equivalent propeller moment spring rate $M_{cf}$ as compared to the equivalent inertia torque spring rate Q, the elastomeric bearing spring rate $C_b$, the equivalent propeller moment spring rate $M_{cf}$ and the equivalent inertia torque spring rate Q will nevertheless all vary sinusoidally. Hence they will add up to a steady force on the control system.

On the other hand, if the spring rate $C_b$ of the feathering bearing 50 be chosen precisely to offset the deficiency of $M_{cf}$ as compared with Q—not merely to relieve it in part—the swash plate will be freed, at the chosen flight condition from any force whatsoever. The individual blades will have been so tuned by the selection of the precisely balancing torsional constraint of the flapping hinge bearing, that no blade reaction will be imposed on the swash plate.

From the mathematical calculations, it will be apparent that this applies only at a particular design flight condition, characterized by a selected rate of rotation and under which the total blade angular movement in pitch change has been precisely calculated. Under other flight conditions, there will be a significant stick force, or characteristic control "feel," apparent to the pilot as the helicopter departs from the chosen flight condition.

As has been shown the elastomeric constraints which in the present invention are inserted in the flapping and feathering hinges, give to the offset-hinged rotor a new perfection in achieving the purpose of attaining the appropriate blade lift coefficient at all points in the cycle of rotation with the greatest smoothness. Also, tuning is accomplished, which yields favorable flight characteristics. In general, detrimental effects of high centrifugal forces are eliminated while favorable new characteristics are attained, much as if the beneficial effects of centrifugal force were present in greater magnitude.

The present invention is capable of utilization in other embodiments of rotating wing aircraft, as will be apparent to those familiar with the art. Substantial modifications in structure and mechanism may be made without departing from the basic teachings hereof. Accordingly, this invention is not to be construed narrowly, but rather as fully coextensive with the claims.

I claim:
1. A rotor system for helicopters, including
three or more blades,
root retention means for each blade,
feathering hinge means mounting each root retention means at its inboard end,
flapping hinge means mounting each feathering hinge means at its inboard end, and
a rotor hub mounting each of said flapping hinge means radially outward from the hub center,
the rotor system being characterized in having
an elastic torsional constraint bearing interposed in centrifugal-force-resisting position in each of said feathering hinge means and said flapping hinge means,
together with keying means to apply the spring rate of each such flapping hinge constraint bearings in the same sense as blade centrifugal force acts to resist coning, and
keying means to apply the spring rate of each said feathering hinge constraint bearings to augment blade-pitch-reducing propeller moment.

2. A helicopter rotor system tuned to achieve advantageous operating characteristics, comprising
more than two rotor blades,
a rotor hub having flapping hinges for said blades at equal angular intervals,
a feathering hinge for each blade secured to and extending radially outward from the flapping hinge and including means at its outboard end to mount the blade, and
pilot-controlled means to vary the pitch of the blade in the feathering hinge throughout an angular range during each cycle or rotation of the hub,
the masses of the blade and its pitch control means having, at rotational speed corresponding to a chosen flight condition, an equivalent intertia torque spring rate,
the blade further having, at such flight condition and for the angular range of pitch change corresponding thereto, an equivalent propeller moment spring rate which partially offsets the inertia torque spring rate,
characterized in that each said flapping hinge and said feathering hinge includes an elastomeric torsional constraint bearing so interposed as to transmit the centrifugal force consequent to blade rotation,
and in that the elastomeric bearings in the feathering hinges have a torsional spring rate relieving the deficiency between the equivalent inertia torque spring rate and the equivalent propeller moment spring rate,
and in that the elastomeric bearings in the flapping hinges have a torsional spring rate act to resist coning,
further characterized in that said torsional constraint bearings have keying means interposed in their respective hinges to set angles at which the torque exerted by said constraint is zero.

3. A helicopter rotor system including
a rotating hub,
a rotor blade,
a feathering hinge assembly including a radial spindle mounted to the hub,
radial bearing means thereon,
blade retention means mounted on said radial means for pitch change movement, and
pilot-controlled means to vary the pitch of the blade in the feathering hinge assembly during each cycle of rotation of the hub,
characterized in that the feathering hinge assembly includes an elastomeric torsional constraint bearing mounted radially along the axis of the feathering hinge and in centrifugal force-resisting relationship between the blade mounting means and the spindle and in having angularly keyed means to impose the torsional constraint of said bearing on pitch change movements,
whereby pitch change movements of the blade are relieved from friction attendant to centrifugal force and are instead subjected to the torsional spring rate of said constraint bearing.

4. A helicopter rotor system including
a rotating hub,
a rotor blade,
a feathering hinge assembly including
a radial spindle mounted to the hub and
a sleeve mounted upon and for angular movement about said spindle,
the sleeve having a blade grip by which the blade is retained, and
pilot-controlled means to vary the pitch of the blade in the feathering hinge assembly throughout an angular range during each cycle of the rotation of the hub,
the masses of the blade and its pitch control means having, at rotational speed corresponding to a chosen flight condition, an equivalent inertia torque spring rate,
the blade further having, at such flight condition and for the angular range of pitch change corresponding thereto, an equivalent propeller moment spring rate which partially offsets the inertia torque spring rate,
characterized in that
the feathering hinge assembly includes an elastomeric torsional constraint bearing interposed between the sleeve and spindle in centrifugal force-resisting relationship, and in that the said elastomeric bearings have a torsional spring rate relieving the deficiency between the equivalent inertia torque spring rate and the equivalent propeller moment spring rate,
further characterized in that the elastomeric torsional constraint bearing so interposed has end plates, each having keying means, one of which keys the torsional constraint to the sleeve and the other of which keys it to the spindle, whereby to establish an angle within such angular range at which the torque exerted by the constraint bearing is zero.

5. A helicopter rotor system comprising
more than two rotor blades, a rotor hub having flapping hinges for said blades at equal angular intervals, and a feathering hinge provision for each blade secured to and extending radially outward from the flapping hinge and including means at its outboard end to mount the blade, and conventional bearing means to resist forward and aft forces in each flapping and feathering hinge, characterized in that each said flapping hinge and feathering hinge includes an elastomeric torsional constraint bearing so interposed as to transmit the centrifugal force consequent to blade rotation, said constraint bearings having keying provisions establishing angles of feathering and coning at which the torque exerted by the constraint bearings is zero.

6. A feathering hinge assembly for helicopters and the like, comprising a spindle having at its inboard end means for mounting to a rotor hub, and having adjacent to its outboard end a pin member concentric with the spindle end of lesser diameter, the pin member having removable centrifugal-load-resisting means adjacent to its outboard end, further comprising an annulus-shaped elastomeric bearing including axially spaced end plates and alternating rubber and metal laminates therebetween, said elastomeric bearing being mounted on the pin member with its outer end plate presented adjacent to and inward of its centrifugal-load-resisting means, radial load-carrying bearing means on said spindle, a sleeve rotatively mounted on said radial load-carrying bearing means, blade-retention means at the outboard end of said sleeve to permit access to said removable means, and a radially inward flange presented about the pin member, said flange including an outboard flange surface presented against the inner end plate of the elastomeric bearing, whereby to transfer the blade centrifugal load from the sleeve to the pin member in compression through the elastomeric bearing.

7. A feathering hinge assembly as defined in claim 6, together with means to key said end plates angularly to the said members against which they are respectively presented, whereby to determine a blade pitch angle at which the elastomeric bearing will exert no torsion.

8. For use in helicopter rotor systems of the type having a rigid hub and a plurality of rotor blades mounted thereon for flapping movements, a flapping hinge assembly for each blade comprising a rotor hub clevis fitting including a pair of clevis members projecting parallel to each other from the hub and having aligned bores, whereby a flapping axis is established offset from the axis of the hub, a flapping hinge pin on said flapping axis, said pin having forward and aft end portions extending through the clevis bores and being of substantially lesser diameter than said bores, inboard end flapping connector means for each rotor blade fixedly mounted on said pin between the parallel clevis members, said inboard end connector means having annular forward and aft load-applying faces presented within the parallel clevis members, the said parallel clevis members having annular forward and aft load-resisting faces presented in registration with said load-applying faces, annular bearing means interposed between the said registering load-applying faces, whereby to transfer forward and aft forces from the connector means to the hub, and elastomeric flapping bearings fitted within said bores and supporting therein the end portions of the pin, whereby to transfer to the hub the centrifugal loads imposed by the flapping blades, the said elastomeric flapping bearing having means to establish a predetermined angularity between the pin and the clevis bores, at which the torsional constraint of the elastomeric flapping bearings is zero.

9. For use in a flapping hinge mounting the connector means of a helicopter rotor blade to the rotor hub, an elastomeric bearing comprising split cylindrical metal laminates, rubber-like elastic laminates alternating with and joining said split cylindrical metal laminates to form a cylindrical elastomeric bearing, a radially-inner continuous metal cylinder adhered to and forming the inner bearing wall and having keying means to engage such blade-connector means, further having adhered thereto a radially-outer metal cylindrical wall having keying means to engage such a rotor hub, whereby to determine a blade coning angle at which the elastomeric bearing will exert no torsion.

10. The flapping hinge elastomeric bearing defined in claim 9, the radially inner metal cylinder forming the inner bearing wall being of greater axial extent than the radially outer cylindrical wall, and the laminates being of graduated axial extent taperingly therebetween.

11. In a helicopter rotor articulation system a flapping hinge provision comprising a mast hub including an outwardly extending clevis having aligned bores by which a flapping hinge axis is established, a hinge pin having ends within said clevis bores of smaller diameter than the said bores, a blade root spindle rigidly secured at its inner end to the hinge pin within the clevis, elastomeric constraint bearings fitted about the hinge pin ends within the clevis bores, each constraint bearing having a radially outer wall keyed to the bore within which it is fitted and a radially inner wall keyed to the pin end therein, whereby to establish for the flapping hinge an angle at which the elastomeric constraint is zero.

12. In a helicopter rotor system, articulation hinges including an inner articulated member defining a hinge axis, an outer articulated member journalled thereto for relative angular movement therebetween, both said members having keyway means, and a torsional constraint bearing interposed between said members, said bearing having a torsionally deflectable body bounded by metal walls movable angularly relative to each other on the torsional deflection of the body, each metal wall having a key means receivable within the keyway means of the inner and outer members between which the constraint bearing is interposed, the said metal walls being bonded to the deflectable body at a predetermined angle measured between their key means, as to establish an angle of zero constraint between the inner and outer articulated members.

References Cited by the Examiner

UNITED STATES PATENTS 2,471,578   5/49   Moore _____ 170—160.52
3,111,172   11/63   Gorndt et al. _____ 170—160.51

FOREIGN PATENTS 934,336   1/48   France.

JULIUS E. WEST, *Primary Examiner.*